United States Patent Office 3,236,728
Patented Feb. 22, 1966

3,236,728
PROCESS OF FUMIGATION WITH LOWER ALKYL CYCLOALKANE CARBOXYLATES
Peter E. Newallis, Morris Plains, N.J., and George L. Walker, Durham, N.H., assignors to Allied Chemical Corporation, New York, N.Y., a corporation of New York
No Drawing. Filed May 3, 1965, Ser. No. 452,928
2 Claims. (Cl. 167—39)

This invention relates to a process for combatting noxious insects by fumigation.

Many insect and mite pests which infest areas and confined spaces which are difficult to reach or control by direct application of insecticides are readily controlled by exposure to toxic gases or vapors known as fumigants. This method is especially valuable in controlling pests in greenhouses, homes, warehouses, and the like, and is especially effective in ridding stored grain of destructive pests.

We have now found that the lower alkyl esters of cycloalkane carboxylic acids of the formula

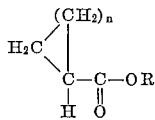

wherein R represents a lower alkyl radical to 1 to 4 carbon atoms, and n is an integer from 1 to 2, are especially effective in destroying or controlling a wide variety of insect pests and scale organisms, especially such organisms as the common house fly and the various grain infesting insects and their larvae, as well as many plant pests. Thus we have found the lower alkyl cycloalkane carboxylates to be effective fumigants in combatting the common house fly (*Musca domestica*), the confused flour beetle (*Tribolium confusum*), black carpet beetles (*Attagenus piceus*), varied carpet beetles (*Anthrenus verbasci*), lesser meal worms (*Alphitobius diaperinus*), yellow meal worms (*Tenebrio molitor*), pea aphids (*Macrosiphum pisi*) two spotted spider mites (*Tetranychus telarius*), brown soft scale (*Coccus hesperidum*), and the like.

Wherever the term "insects" is used in the instant specification and claims, it is to be understood as referring to the insects and mites in adult, pupal, nymphal, larval or egg stages.

The lower alkyl cycloalkane carboxylates are known compounds. They are colorless liquids, the methyl cyclopropane carboxylate boiling at 134.5° C., the ethyl cyclopropane carboxylate boiling at 145°–150° C. A number of methods for preparing them are known including that of reacting an alkali metal hydride with an alkyl chloroalkanoate as described in U.S. Patent 2,992,269.

Fumigation with the lower alkyl cycloalkane carboxylates as practiced according to our invention, is carried out according to conventional fumigation practices by exposing the organisms to the vapor of the lower alkyl cycloalkane carboxylates. This is usually accomplished by placing a small amount of the liquid toxicant in the space to be fumigated, or injecting relatively small amounts into the body of the material to be treated, such as grain or the like, and permitting the toxicant to vaporize, thus subjecting the organisms to be controlled to the vapors of the toxicant for a period sufficient to rid the space of the pests. Or, if desired, the toxicant may be initially applied in vapor form.

The following specific examples further illustrate our invention. Parts are by weight except as otherwise noted.

EXAMPLE 1

Methyl cyclopropane carboxylate was tested as a fumigant against house fly pupae by placing 0.1 cubic centimeter of the methyl cyclopropane carboxylate on a cellucotton wad in a gallon jar. Twenty-five house fly pupae, confined in vials lightly stoppered with cellucotton were placed in each jar, and the jar was sealed. A similar jar containing no toxicant was charged with the same number of house fly pupae. After six hours' exposure the pupae were removed from the gallon jars. Seven days after exposure the vials were examined for number of flies emerged and percent kill with results shown below.

| Compound | No. Pupae | 7 Days | |
|---|---|---|---|
| | | No. Emerged | Percent Control |
| Methyl cyclopropane carboxylate | 25 | 0 | 100 |
| No toxicant | 25 | 25 | 0 |

EXAMPLE 2

Tests to determine the effect of methyl cyclopropane carboxylate as a toxicant against various adult insects and larvae were carried out in a manner similar to that described in Example 1 above, except that 10 adults or larvae were used and the organisms were provided with food. Exposure to the toxicant (0.1 cc. per gallon jar) was maintained for 24 hours. The organisms were removed from the jars and were then observed immediately and again after 1 and 3 days for percent mortality with the results shown below:

| | Days after 24-hour exposure, percent Dead | | |
|---|---|---|---|
| | 0 | 1 | 3 |
| Confused flour beetle (adults) | 100 | 100 | 100 |
| Lesser meal worm (larvae) | 100 | 100 | 100 |
| Black carpet beetle (larvae) | 0 | 0 | 100 |
| Yellow meal worm (larvae) | 0 | 80 | [1] 80 |

[1] Remainder near dead.

The test specimens exposed in jars containing no toxicant showed zero mortality in all the tests.

EXAMPLE 3

Fumigant tests were carried out in a manner similar to that described in Example 2 above on pea aphids, two spotted spider mites and brown soft scale using gallon jars, each containing 0.05 cubic centimeter of methyl cyclopropane carboxylate on a cellucotton wad, as toxicant. Exposure of the organisms was maintained for 4½ hours, after which they were removed from jars and observed for percent mortality 1 day and 6 days after exposure with results shown below:

| | Percent Mortality | | | | |
|---|---|---|---|---|---|
| | Pea aphids | | Two spotted spider mites | | Brown soft scale young crawlers |
| | Adults 1 day | Young 6 days | Adults 1 day | Young 6 days | |
| Methyl cyclopropane carboxylate | 100 | 100 | 100 | 100 | 100 |
| No toxicant | 0 | 0 | 0 | 0 | 0 |

EXAMPLE 4

The tests described in Example 3 were repeated except that lower exposure times of the specimen to the toxicant of 3 hours and 1½ hours respectively were employed with results shown in the table below:

*Table*

| Compound | Exposure Period, hrs. | Percent Mortlaity | | | | | |
|---|---|---|---|---|---|---|---|
| | | Pea Aphids | | Two spotted spider mites | | Brown soft scale | |
| | | Adults | Nymphs | Adults | Eggs | Crawlers | Adults |
| Methyl cyclopropane carboxylate | 3 | 100 | 100 | 99.5 | 100 | 93.5 | 80 |
| Methyl cyclopropane carboxylate | 1½ | 40 | 90 | 20 | 100 | 59.7 | 50 |
| No toxicant | | 0 | 0 | 0 | 0 | 13.1 | 0 |

While the above describes the preferred embodiments of our invention, it will be understood that departures may be made therefrom within the scope of the specification and claims.

We claim:

1. The process for combatting noxious insects which comprises subjecting said insects to the action of the vapors of a lower alkyl cycloalkane carboxylate of the formula

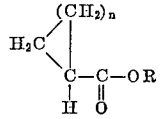

wherein R represents a lower alkyl radical of 1 to 4 carbon atoms, and $n$ is an integer from 1 to 2.

2. The process according to claim 1 wherein R is methyl, and $n$ is 1.

References Cited by the Examiner

King, Chemicals Evaluated as Pesticides, Superintendent of Documents, U.S. Government Printing Office, Washington 25, D.C., 1954, p. 4–7, 126 and 144.

JULIAN S. LEVITT, *Primary Examiner.*